US010804814B2

(12) United States Patent
Sugawara et al.

(10) Patent No.: US 10,804,814 B2
(45) Date of Patent: Oct. 13, 2020

(54) POWER CONVERTER

(71) Applicant: Mitsubishi Electric Corporation, Chiyoda-ku (JP)

(72) Inventors: Retsu Sugawara, Chiyoda-ku (JP); Kazutoshi Awane, Chiyoda-ku (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/609,251

(22) PCT Filed: Feb. 16, 2018

(86) PCT No.: PCT/JP2018/005519
§ 371 (c)(1),
(2) Date: Oct. 29, 2019

(87) PCT Pub. No.: WO2018/225301
PCT Pub. Date: Dec. 13, 2018

(65) Prior Publication Data
US 2020/0099314 A1    Mar. 26, 2020

(30) Foreign Application Priority Data

Jun. 8, 2017  (JP) ................................ 2017-113073

(51) Int. Cl.
*H02M 7/523*  (2006.01)
*H02M 3/158*  (2006.01)

(52) U.S. Cl.
CPC ............ *H02M 7/523* (2013.01); *H02M 3/158* (2013.01)

(58) Field of Classification Search
CPC ...... H02M 3/156; H02M 3/158; H02M 7/523; H02M 7/5233; H02M 7/538;
(Continued)

(56) References Cited

U.S. PATENT DOCUMENTS 9,484,829 B2 * 11/2016 Fujita ...................... H02M 1/14
2007/0188265 A1    8/2007 Perreault et al.
(Continued)

FOREIGN PATENT DOCUMENTS

EP          2525491 A1 * 11/2012  ....... H03K 17/08128
JP        2007202342    *  8/2007  ............ H02M 3/155
(Continued)

OTHER PUBLICATIONS

International Search Report dated Apr. 24, 2018 in PCT/JP2018/005519 filed on Feb. 16, 2018.
(Continued)

*Primary Examiner* — Matthew V Nguyen
(74) *Attorney, Agent, or Firm* — Xsensus LLP

(57) ABSTRACT

A capacitor has a parasitic inductance component and is electrically connected between a positive line and a negative line. A converter includes a reactor provided in the positive line and performs voltage conversion of a DC voltage smoothed by a capacitor. An inverter performs DC-AC conversion between the converter and an AC motor by switching control. A path of the positive line which connects a DC power supply and the capacitor has an inductance smaller than an inductance of a path of the negative line which connects the DC power supply and the capacitor. A difference between the inductance of the path and the inductance of the path is less than twice the parasitic inductance component.

5 Claims, 8 Drawing Sheets

(58) Field of Classification Search
CPC .......... H02M 7/53803; H02M 7/6387; H02M 2011/007; H02M 2011/123
See application file for complete search history.

(56) References Cited

U.S. PATENT DOCUMENTS

| | | |
|---|---|---|
| 2013/0114305 A1 | 5/2013 | Ide et al. |
| 2014/0306787 A1 | 10/2014 | Kato et al. |
| 2017/0063218 A1* | 3/2017 | Nishizawa .............. B60L 53/20 |
| 2019/0222133 A1* | 7/2019 | Matlok ................... H02M 1/32 |

FOREIGN PATENT DOCUMENTS

| | | | | |
|---|---|---|---|---|
| JP | 2009-296756 A | | 12/2009 | |
| JP | 2012-29404 A | | 2/2012 | |
| JP | 2014042410 | * | 3/2014 | ............ H02M 3/155 |
| JP | 2014081837 | * | 5/2014 | ............... G05F 1/67 |
| WO | WO 2013/099540 A1 | | 7/2013 | |

OTHER PUBLICATIONS

Extended European Search Report dated Apr. 21, 2020 in European Patent Application No. 18813865.5, 9 pages.

* cited by examiner

POWER CONVERTER

TECHNICAL FIELD

The present invention relates to a power converter that performs power conversion between a DC power supply and an AC load, and more particularly, to a power converter that includes a converter including a reactor and performs power conversion between the DC power supply and the AC load.

BACKGROUND ART

A power converter is known that performs power conversion between a DC power supply and an AC load by switching control. In switching control of high frequency (e.g., a frequency of 20 kHz or more), high-frequency noise (switching noise) may occur resulting from switching of a switching element of an inverter in the power converter. A mechanism for generating such switching noise is described as follows. A neutral potential of an AC load (e.g., AC motor) varies due to switching of the inverter, causing common mode noise.

If the circuitry of the power converter is unbalanced between the positive side and the negative side, mode conversion may occur between common mode noise and normal mode noise. Specifically, common mode noise may be converted to normal mode noise, or normal mode noise may be converted to common mode noise. A technique is thus proposed for preventing mode conversion to reduce switching noise.

For example, the power converter disclosed in Japanese Patent Laying-Open No. 2009-296756 (PTL 1) includes first and second loop circuits. The first loop circuit includes a center tap of a secondary coil, a capacitor, a high-potential-side Y-capacitor, a high-potential-side wire, and a high-potential-side switching element. In contrast, the second loop circuit includes a center tap, a capacitor, a low-potential-side Y-capacitor, a low-potential-side wire, and a low-potential-side switching element. In the power converter disclosed in PTL 1, the center tap is connected to a connection point between the high-potential-side Y-capacitor and the low-potential-side Y-capacitor. This causes the impedance of the first loop circuit and the impedance of the second loop circuit to be equal to each other. This cancels the imbalance between the power converters, so that mode conversion can be prevented (e.g., see paragraph [0038] of PTL 1).

CITATION LIST

Patent Literature

PTL 1: Japanese Patent Laying-Open No. 2009-296756
PTL 2: Japanese Patent Laying-Open No. 2012-29404
PTL 3: International Publication No. 2013/99540

SUMMARY OF INVENTION

Technical Problem

The power converter disclosed in PTL 1 steps down the voltage (e.g., several hundreds of volts) of a high-voltage battery and outputs a resultant voltage to a low-voltage battery (e.g., 12-V battery), and has a configuration including an insulating converter including a transformer (e.g., see paragraphs [0028] to [0032] and FIG. 1 of PTL 1).

Meanwhile, a power converter having a configuration including a converter including a reactor has been widely used. PTL 1 does not particularly describe such a configuration including a converter, and also does not describe a study on a reduction in the switching noise in such a configuration. It is desirable that switching noise be preferably reduced also in the power converter including a converter with a reactor.

The present invention has been made to solve the above problem, and has an object to preferably reduce switching noise in a power converter that includes a converter including a reactor and performs power conversion between a DC power supply and an AC load.

Solution to Problem (1) A power converter according to an aspect of the present invention includes a positive terminal and a negative terminal, first and second power lines, a smoothing capacitor, a converter, and an inverter. The positive terminal and the negative terminal receive power supplied from a DC power supply. The first power line is electrically connected with a first terminal among the positive terminal and the negative terminal. The second power line is electrically connected with a second terminal among the positive terminal and the negative terminal. The smoothing capacitor has a parasitic inductance component and is electrically connected between the first power line and the second power line. The converter includes a reactor provided in the first power line and performs voltage conversion of a DC voltage smoothed by the smoothing capacitor. The inverter performs DC-AC conversion between the converter and an AC load by switching control. A first path of the first power line has an inductance smaller than an inductance of a second path of the second power line. The first path connects the first terminal and the smoothing capacitor. The second path connects the second terminal and the smoothing capacitor. A difference between the inductance of the second path and the inductance of the first path is less than twice the parasitic inductance component of the smoothing capacitor.

(2) Preferably, the power converter further includes an inductor provided in the second path. The inductor has an inductance less than twice the parasitic inductance component of the smoothing capacitor.

(3) Preferably, the inductance of the second path is a parasitic inductance component of the second path. The parasitic inductance component of the second path is less than twice the parasitic inductance component of the smoothing capacitor.

(4) Preferably, the power converter further includes a first inductor provided in the first path and a second inductor provided in the second path. A difference between an inductance of the second inductor and an inductance of the first inductor is less than twice the parasitic inductance component of the smoothing capacitor.

(5) A power converter according to another aspect of the present invention includes a positive terminal and a negative terminal, first and second power lines, a smoothing capacitor, a converter, and an inverter. The positive terminal and the negative terminal receive power supplied from a DC power supply. The first power line is electrically connected with a first terminal among the positive terminal and the negative terminal. The second power line is electrically connected with a second terminal among the positive terminal and the negative terminal. The smoothing capacitor has a parasitic resistance component and is electrically connected between the first power line and the second power line. The converter includes a reactor provided in the first power line and performs voltage conversion of a DC voltage smoothed by the smoothing capacitor. The inverter performs DC-AC conversion between the converter and an AC load by switching control. A first path of the first power line has a resistance smaller than a resistance of a second path of the second power line. The first path connects the first terminal and the smoothing capacitor. The second path connects the second terminal and the smoothing capacitor. A difference between the resistance of the second path and the resistance of the first path is less than twice the parasitic resistance component of the smoothing capacitor.

Advantageous Effects of Invention

The present invention can preferably reduce switching noise in a power converter that includes a converter including a reactor and performs power conversion between a DC power supply and an AC load.

DESCRIPTION OF EMBODIMENTS

Embodiments for implementing the present invention will be described below in detail with reference to the drawings. The same or corresponding parts are designated by the same references, and description thereof will not be repeated.

Embodiment 1

A configuration of a power converter according to a comparative example will now be described for easy understanding of the features of a power converter according to Embodiment 1.

COMPARATIVE EXAMPLE

Figure 1:
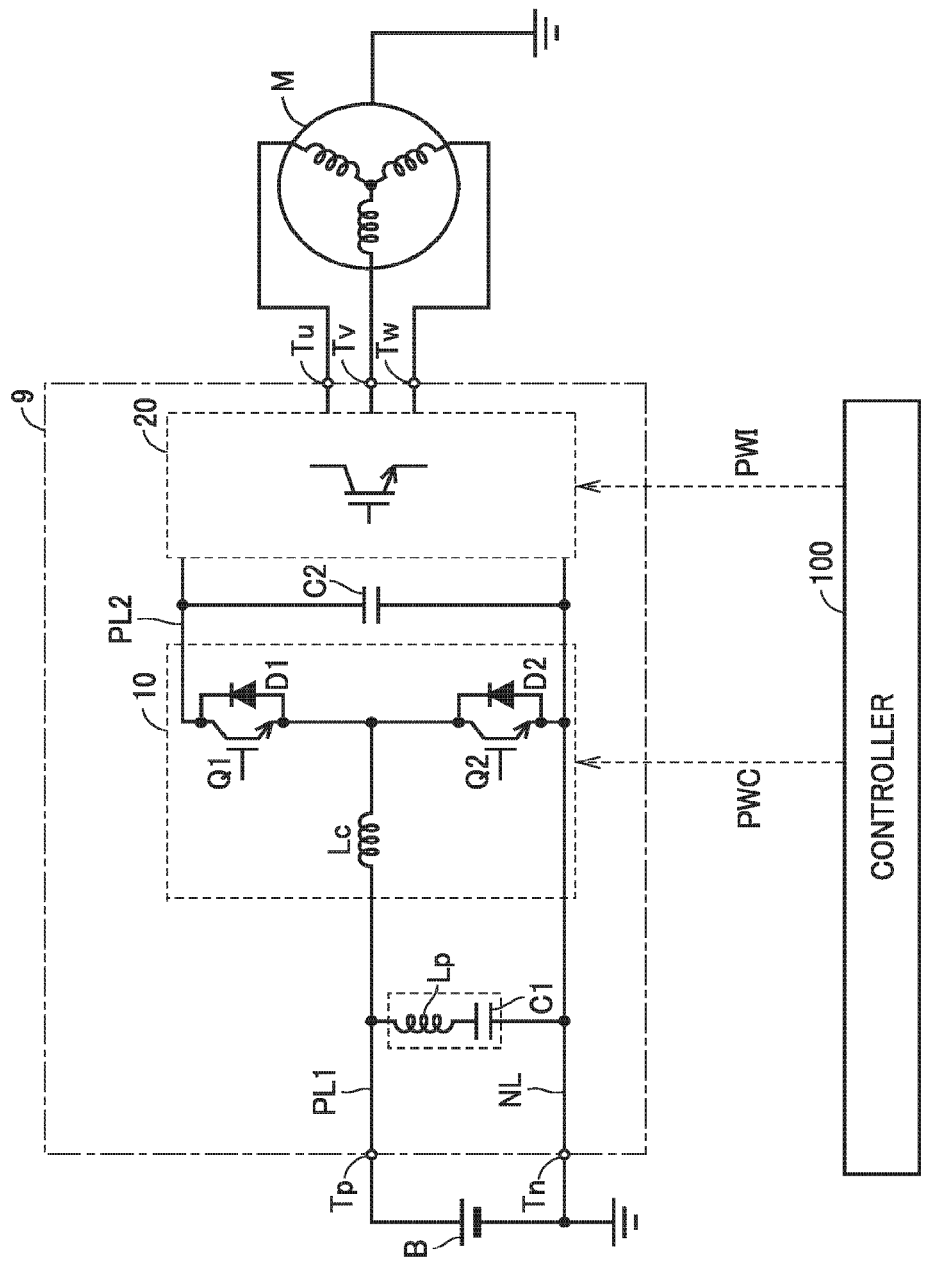
FIG. 1 is a circuit block diagram schematically showing a configuration of a power converter according to a comparative example.

FIG. 1 is a circuit block diagram schematically showing a configuration of a power converter according to a comparative example. Referring to FIG. 1, a power converter 9 includes a positive terminal Tp and a negative terminal Tn, a positive line PL1, a negative line NL, a capacitor C1, a converter 10, a positive line PL2, a capacitor C2, an inverter 20, a U-phase terminal Tu, a V-phase terminal Tv, and a W-phase terminal Tw. Power converter 9 is configured to perform power conversion (DC-AC conversion) between DC power and AC power.

A DC power supply B is, for example, a power storage device, and is a secondary battery such as a nickel-hydride battery or a lithium ion secondary battery, or a capacitor such as an electric double layer capacitor. DC power supply B is not limited to a secondary battery and may be a primary battery. Alternatively, DC power supply B may be a power supply (e.g., stabilized power supply) that generates DC constant voltage or a power generator (e.g., solar battery) configured to generate DC power.

An AC motor M is an AC load that consumes AC power supplied from DC power supply B through power converter 9 to generate desired motive power. More specifically, AC motor M is a Y-connection three-phase AC motor. AC motor M may be an induction motor or a motor of any other type (e.g., synchronous motor).

Positive terminal Tp and negative terminal Tn receive power supplied from DC power supply B. Positive terminal Tp is electrically connected with positive line PL (first power line). Negative terminal Tn is electrically connected with negative line NL (second power line).

Capacitor (smoothing capacitor) C1 is electrically connected between positive line PL1 and negative line NL. Capacitor C1 smoothes a DC voltage from DC power supply B and supplies the smoothed DC voltage to converter 10. Capacitor C1 has a parasitic inductance component Lp. Parasitic inductance component Lp is represented by an inductor connected in series with capacitor C1 (capacitance component) in the circuit block diagram.

Based on a signal PWC from a controller 100, converter 10 boosts the voltage between positive line PL1 and negative line NL and outputs the boosted voltage between positive line PL2 and negative line NL. Converter 10 includes a reactor Lc, switching elements Q1 and Q2, and diodes D1 and D2.

Each of switching elements Q1 and Q2 is, for example, an insulated gate bipolar transistor (IGBT) or a power metal oxide semiconductor (MOS) transistor. Switching elements Q1 and Q2 are connected in series between positive line PL2 and negative line NL. Specifically, switching element Q1 has a collector connected to positive line PL2. Switching element Q1 has an emitter connected to a collector of switching element Q2. Switching element Q2 has an emitter connected to negative line NL.

Reactor Lc is provided in positive line PL1. Specifically, reactor Lc has a first end electrically connected to positive line PL1. Reactor Lc has a second end electrically connected to a connection point between the emitter of switching element Q1 and the collector of switching element Q2.

Diodes D1 and D2 are connected in anti-parallel with switching elements Q1 and Q2, respectively. In other words, diodes D1 and D2 are respectively connected in parallel with switching elements Q1 and Q2 such that the direction from the emitter side toward the collector side is a forward direction.

The configuration of converter 10 is not limited to the configuration shown in FIG. 1 as long as converter 10 includes a reactor and has an unbalanced configuration (a configuration in which the positive side and the negative side are electrically asymmetric to each other). Converter 10 may be, for example, a chopper circuit (e.g., non-insulated type DC/DC converter) of another type.

Capacitor C2 is electrically connected between positive line PL2 and negative line NL. Capacitor C2 smoothes a DC voltage supplied from converter 10 and supplies the smoothed DC voltage to inverter 20.

Based on a signal PWI from controller 100, inverter 20 converts the DC power supplied from converter 10 to a three-phase alternating current and outputs the three-phase alternating current to AC motor M, thereby driving AC motor M. Inverter 20 includes a U-phase arm, a V-phase arm, and a W-phase arm (see FIG. 3 for any arm) each connected in parallel between positive line PL2 and negative line NL. Midpoints of the U-phase arm, the V-phase arm, and the W-phase arm are electrically connected to U-phase terminal Tu, V-phase terminal Tv, and W-phase terminal Tw, respectively.

U-phase terminal Tu is configured to be connectable with a U-phase line of AC motor M. V-phase terminal Tv is configured to be connectable with a V-phase line of AC motor M. W-phase terminal Tw is configured to be connectable with a W-phase line of AC motor M.

Controller 100 is composed of an electronic control unit including a built-in central processing unit (CPU) and a built-in memory, which are not shown. At least part of controller 100 may be configured to perform predetermined mathematical and logical operations by hardware such as an electronic circuit. Controller 100 is configured to perform various processes for controlling converter 10 and inverter 20 based on a map and a program stored in the memory. More specifically, controller 100 generates a pulse width modulation (PWM) signal for driving converter 10 by pulse width modulation and outputs the generated PWM signal to converter 10 as signal PWC. Controller 100 also generates a PWM signal for driving AC motor M and outputs the generated PWM signal to inverter 20 as signal PWI.

<Noise Generation Mechanism and Noise Conversion Mechanism>

Power converter 9 configured as described above generates common mode noise due to fluctuations in the midpoint potential of AC motor M by switching control of inverter 20. A propagation path of common mode noise and a mechanism for converting common mode noise to normal mode noise will be described below.

Figure 2:
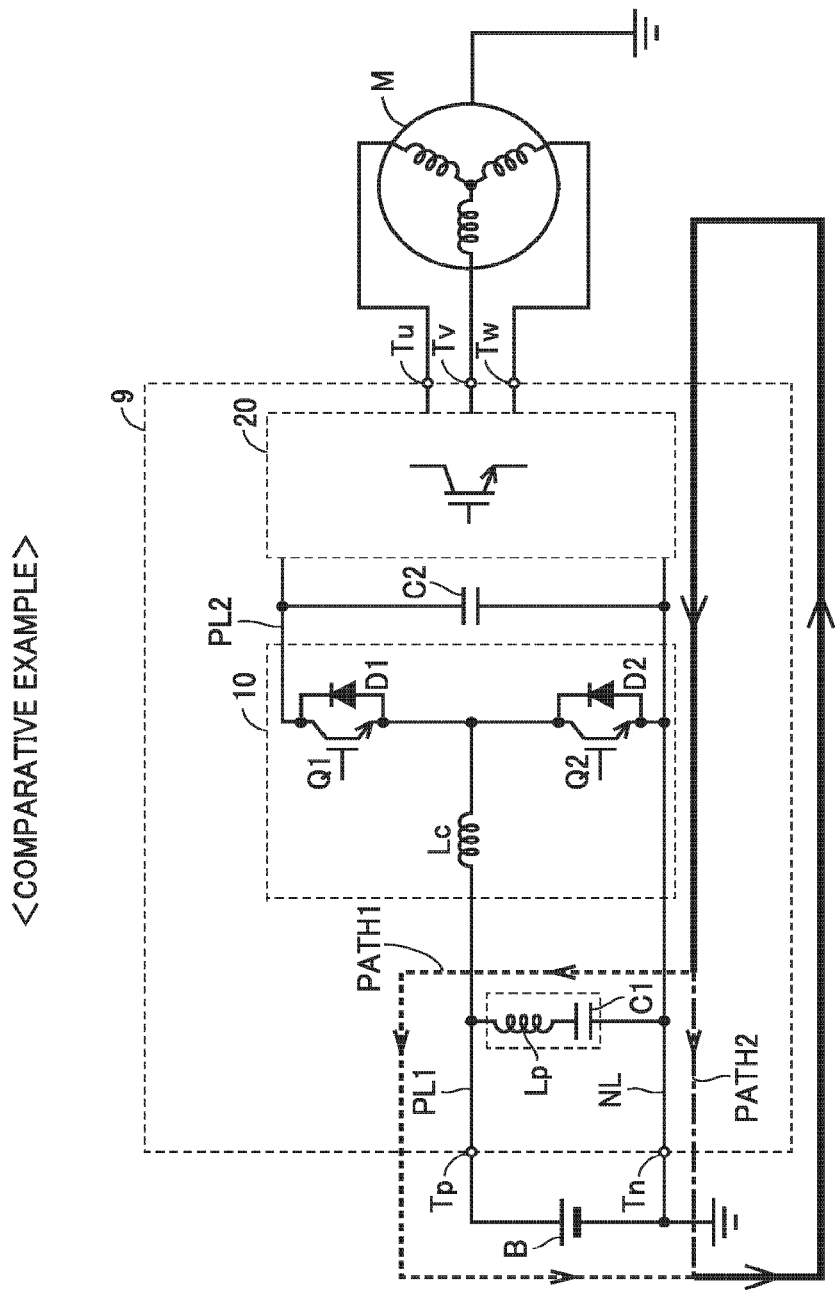
FIG. 2 is a diagram for illustrating a noise generation mechanism and a noise conversion mechanism in the power converter in the comparative example.

FIG. 2 is a diagram for illustrating a noise generation mechanism and a noise conversion mechanism in power converter 9 according to the comparative example. Schematically, referring to FIG. 2, common mode noise passes in a loop so as to pass through a floating capacitance to ground of AC motor M, inverter 20, converter 10, and DC power supply B in the stated order and return to AC motor M through the ground (indicated by the thick line).

More specifically, although the magnitude of the common mode noise generated by switching control is equal between a positive-side path (path through positive lines PL1 and PL2) and a negative-side path (path through negative line NL) of power converter 9, the impedance of the reactor in the step-up converter is generally greater than the impedance of the wire (positive line or negative line). In the configuration in which reactor Lc is provided in the positive-side path (positive line PL1) as in power converter 9, thus, common mode noise passes through the negative-side path (negative line NL) in which reactor Lc is not provided.

The common mode noise that has passed through converter 10 in negative line NL is branched, at a connection point between capacitor C1 and negative line NL, into a path PATH1 (indicated by the dashed line) running to positive terminal Tp via capacitor C1 and a path PATH2 (indicated by the alternate long and short dash line) running to negative terminal Tn not via capacitor C1. The impedance of path PATH1 is greater than the impedance of path PATH2 by an amount by which path PATH1 includes capacitor C1 and its parasitic inductance component Lp. This causes an impedance imbalance between path PATH1 and path PATH2, so that part of the common mode noise is converted to normal mode noise. Path PATH1 corresponds to a "first path" according to the present invention, and path PATH2 corresponds to a "second path" according to the present invention.

Herein, a current Ip flowing through positive line PL1 and a current In flowing through negative line NL are expressed by Equations (1) and (2), respectively. In Equations (1) and (2) (and equations described below), Z represents an impedance to ground of DC power supply B, $I_{common}$ represents common mode noise passing through the ground, and ω represents an angular frequency of common mode noise $I_{common}$.

[Math 1]

$$I_p = \frac{Z}{2Z + i\omega L_p} I_{common} \quad (1)$$

$$I_n = \frac{Z + i\omega L_p}{2Z + i\omega L_p} I_{common} \quad (2)$$

$$I_{normal} = I_n - I_p = \frac{i\omega L_p}{2Z + i\omega L_p} I_{common} \quad (3)$$

Normal mode noise $I_{normal}$ is calculated as a difference (In−Ip) between current In and current Ip, and is expressed as shown in Equation (3). Equation (3) reveals that a conversion rate T ($T=I_{normal}/I_{common}$) from common mode noise $I_{common}$ to normal mode noise $I_{normal}$ depends on parasitic inductance component Lp of capacitor C1. Conversion rate T from common mode noise $I_{common}$ to normal mode noise $I_{normal}$ may be abbreviated as "conversion rate T" below.

In the comparative example, an impedance imbalance occurs between path PATH1 and path PATH2 due to the presence of parasitic inductance component Lp of capacitor C1 as described above. Consequently, conversion from common mode noise $I_{common}$ to normal mode noise $I_{normal}$ is liable to occur, which may cause switching noise. Embodiment 1 accordingly adopts a configuration in which path PATH2 is further provided with an inductor for balancing. This configuration will be described below in detail.

Present Embodiment

Figure 3:
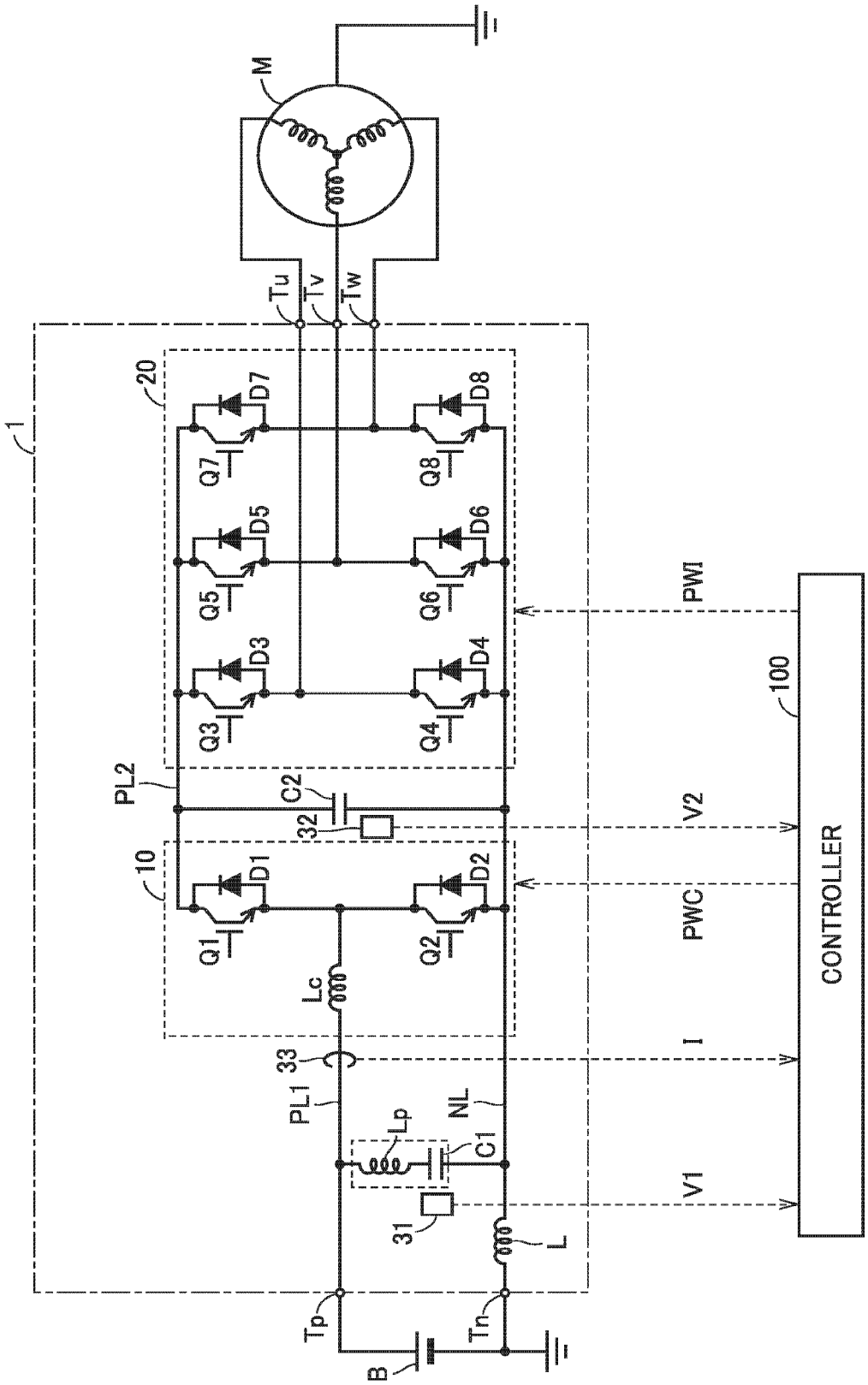
FIG. 3 is a circuit block diagram schematically showing a configuration of a power converter according to Embodiment 1.

FIG. 3 is a circuit block diagram schematically showing a configuration of a power converter according to Embodiment 1. Referring to FIG. 3, power converter 1 according to Embodiment 1 differs from power converter 9 according to the comparative example (see FIG. 1) in that it further includes an inductor L.

Inductor L is provided in negative line NL (second path) between capacitor C1 and negative terminal Tn. Inductor L is electrically connected to the wire (negative line NL) different from the wire (positive line PL1) connected with reactor Lc of converter 10.

The inductance of inductor L is represented by L. Although inductor L is composed of, for example, a discrete component (e.g., coil), an inductance which corresponds to L may be composed of a parasitic inductance component in negative line NL. Inductance L may be achieved by combining the inductance of the discrete component and the parasitic inductance component of negative line NL.

A specific configuration of power converter 1 will be described further. The U-phase arm of inverter 20 includes switching elements Q3 and Q4 connected in series. The V-phase arm includes switching elements Q5 and Q6 connected in series. The W-phase arm includes switching elements Q7 and Q8 connected in series. Also, switching elements Q3 to Q8 are connected in anti-parallel with diodes D3 to D8, respectively. A midpoint of the arm of each phase is connected to a coil of a corresponding one of the phases of AC motor M.

Power converter 1 further includes voltage sensors 31 and 32 and a current sensor 33. Voltage sensor 31 detects a voltage V1 across capacitor C1 as an input voltage of converter 10 and outputs the detection result to controller 100. Voltage sensor 32 detects a voltage V2 across capacitor C2 as an output voltage of converter 10 (an input voltage of inverter 20) and outputs the detection result to controller 100. Current sensor 33 detects a current I flowing through reactor Lc and outputs the detection result to controller 100. Based on a signal from each sensor, controller 100 generates a PWM signal and outputs it to converter 10 as a signal PWC, and also generates another PWM signal and outputs it to inverter 20 as signal PWT.

Since the other components of power converter 1 are similar to the corresponding components of power converter 9 according to the comparative example, detailed description will not be repeated. Specific configurations of converter 10 and inverter 20 are not limited to the example shown in FIG. 3. Voltage sensors 31 and 32 and current sensor 33 are not essential components in the present invention.

Figure 4:
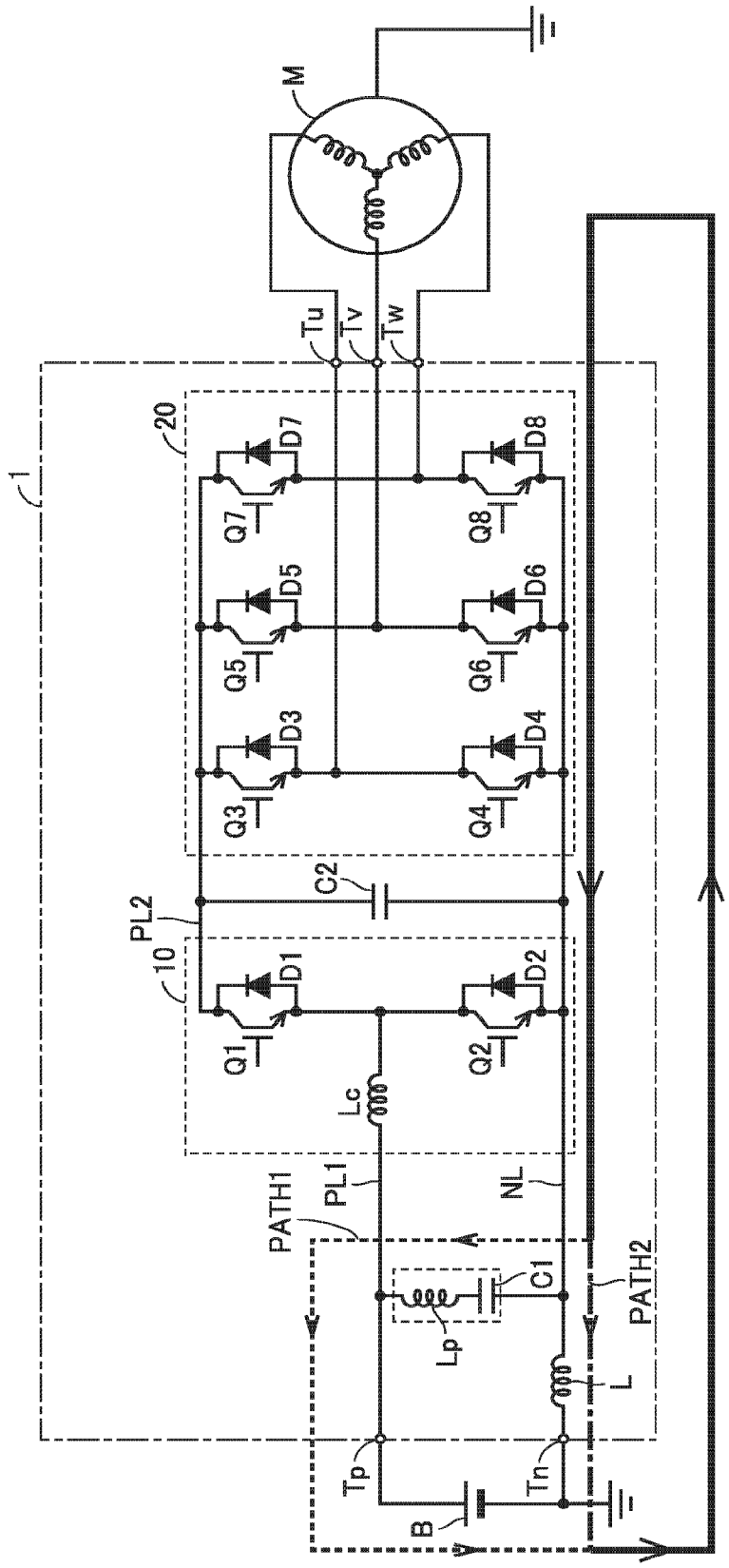
FIG. 4 is a diagram for illustrating a noise propagation path in the power converter according to Embodiment 1.

FIG. 4 is a diagram for illustrating a noise propagation path in power converter 1 according to Embodiment 1. Referring to FIG. 4, the noise propagation path in power converter 1 is qualitatively similar to the noise propagation path in the comparative example (see FIG. 2).

In power converter 1, however, the ratio between the impedance of path PATH1 and the impedance of path PATH2 changes due to the provision of inductor L. Consequently, conversion rate T in power converter 1 depends on a difference (Lp−L) between parasitic inductance component Lp of capacitor C1 and inductance L of inductor L in place of parasitic inductance component Lp of capacitor C1 (see Equations (4) to (6) below).

[Math 2]

$$I_p = \frac{Z + i\omega L}{2Z + i\omega(L_p + L)} I_{common} \quad (4)$$

$$I_n = \frac{Z + i\omega L_p}{2Z + i\omega(L_p + L)} I_{common} \quad (5)$$

$$I_{normal} = I_n - I_p = \frac{i\omega(L_p - L)}{2Z + i\omega(L_p + L)} I_{common} \quad (6)$$

Figure 5:
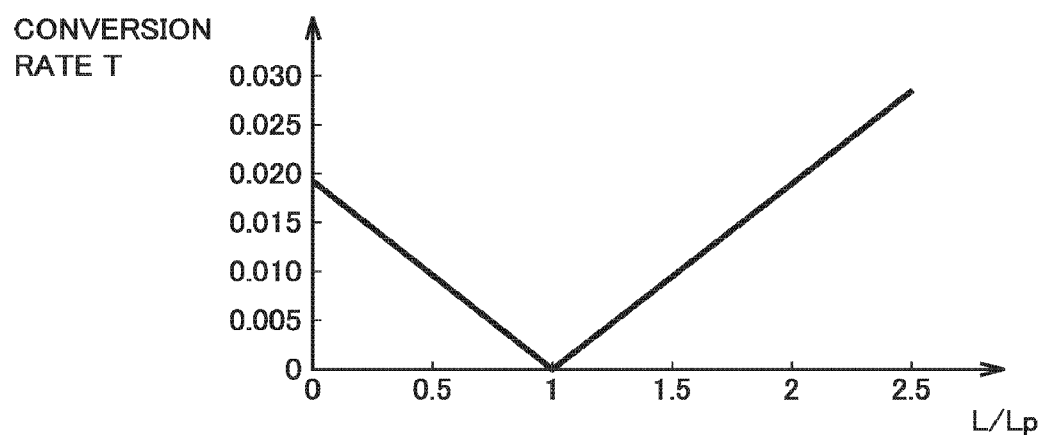
FIG. 5 shows an example correlation between the inductance of an inductor L and a conversion rate.

FIG. 5 shows an example correlation between inductance L of inductor L and conversion rate T. In FIG. 5, the horizontal axis represents the ratio (=L/Lp) of inductance L of inductor L to parasitic inductance component Lp of capacitor C1, and the vertical axis represents conversion rate T from common mode noise $I_{common}$ to normal mode noise $I_{normal}$.

In comparison between Equation (3) and Equation (6), when the coefficient (absolute value) of common mode noise $I_{common}$ on the right side of Equation (6) is smaller than the coefficient (absolute value) of common mode noise $I_{common}$ on the right side of Equation (3), that is, when the relationship $0<L<2L_p+(\omega^2 L p^3/Z^2)$ holds after the change and arrangement of these equations, conversion rate T becomes lower by providing inductor L than in the case where inductor L is not provided.

For example, when inductance L of inductor L is equal to parasitic inductance component Lp of capacitor C1 (when L/Lp=1), conversion rate T is zero as shown in FIG. 5. That is to say, normal mode noise $I_{normal}$ is smallest when inductance L of inductor L is equal to parasitic inductance component Lp of capacitor C1.

In many cases, $(\omega^2 Lp^3/Z^2)$ is negligibly smaller than 2Lp, which can be expressed as $(\omega^2 Lp/Z^2) \ll 2Lp$. In such cases, the above condition for reducing conversion rate T can be approximated to $0<L<2Lp$.

Figure 6:
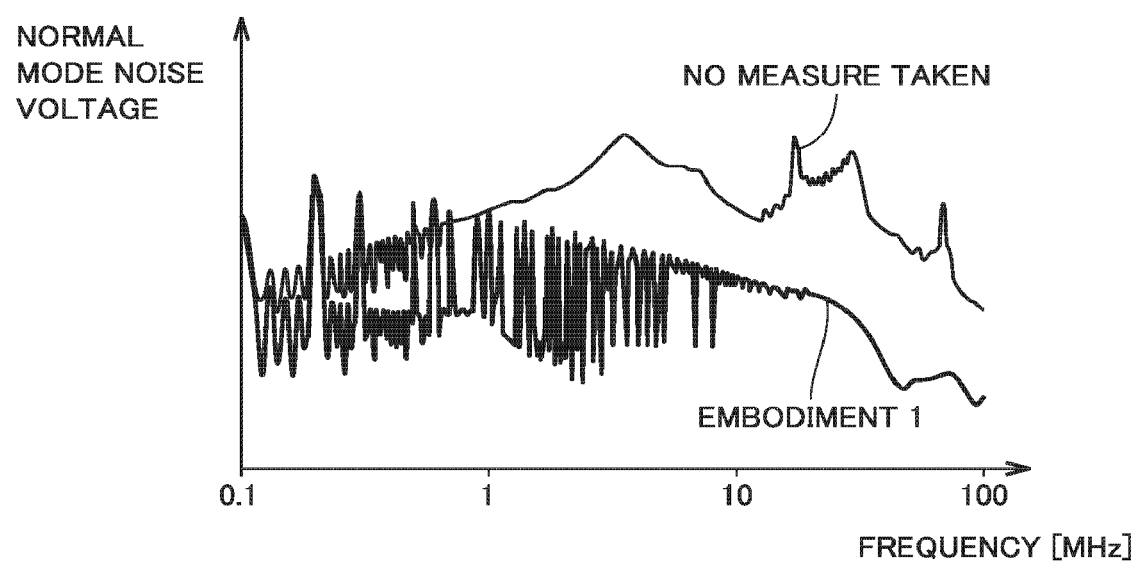
FIG. 6 shows an example analysis result for illustrating a noise reducing effect by the power converter according to Embodiment 1.

FIG. 6 shows an example analysis result for illustrating a noise reducing effect (an effect of reducing normal mode noise) by power converter 1 according to Embodiment 1. In FIG. 6, the horizontal axis represents frequency on a log scale, and the vertical axis represents "normal mode noise voltage" which means a voltage applied to impedance to ground Z of DC power supply B.

In the analysis example shown in FIG. 6, both of parasitic inductance component Lp of capacitor C1 and inductance L of inductor L were set to 30 nH. Impedance to ground Z of DC power supply B was set to 50 Ω. The inductance of reactor Lc was set to 60 pH. In this analysis, a line impedance stabilization network (LISN) was used to provide a constant impedance of DC power supply B as viewed from the noise source.

As shown in FIG. 6, it can be found that the normal mode noise can be reduced over a wide frequency range by providing inductor L having an appropriate inductance (herein, an inductance equal to parasitic inductance component Lp of capacitor C1).

As described above, Embodiment 1 provides inductor L in negative line NL between capacitor C1 and negative terminal Tn and sets inductance L of inductor L such that the relationship 0<L<2Lp holds, so that a difference between the impedance of path PATH1 and the impedance of path PATH2 is smaller than in the case where inductor L is not provided. In particular, the impedance of path PATH1 and the impedance of path PATH2 become equal to each other by setting inductance L of inductor L to be equal to parasitic inductance component Lp of capacitor C1. This reduces (eliminates) the impedance imbalance between path PATH1 and path PATH2, thus restraining conversion from common mode noise $I_{common}$ to normal mode noise $I_{normal}$. Consequently, switching noise can be reduced.

Although not shown, when reactor Lc is provided on the negative line NL side in the configuration of converter 10 differently from the configurations shown in FIGS. 3 and 4, it suffices that inductor L is provided in positive line PL1 between capacitor C1 and positive terminal Tp.

Modification of Embodiment 1

Although Embodiment 1 has described the configuration in which inductor L is provided only in path PATH2, a configuration in which an inductor is provided in both of path PATH1 and path PATH2 is adoptable as described below.

Figure 7:
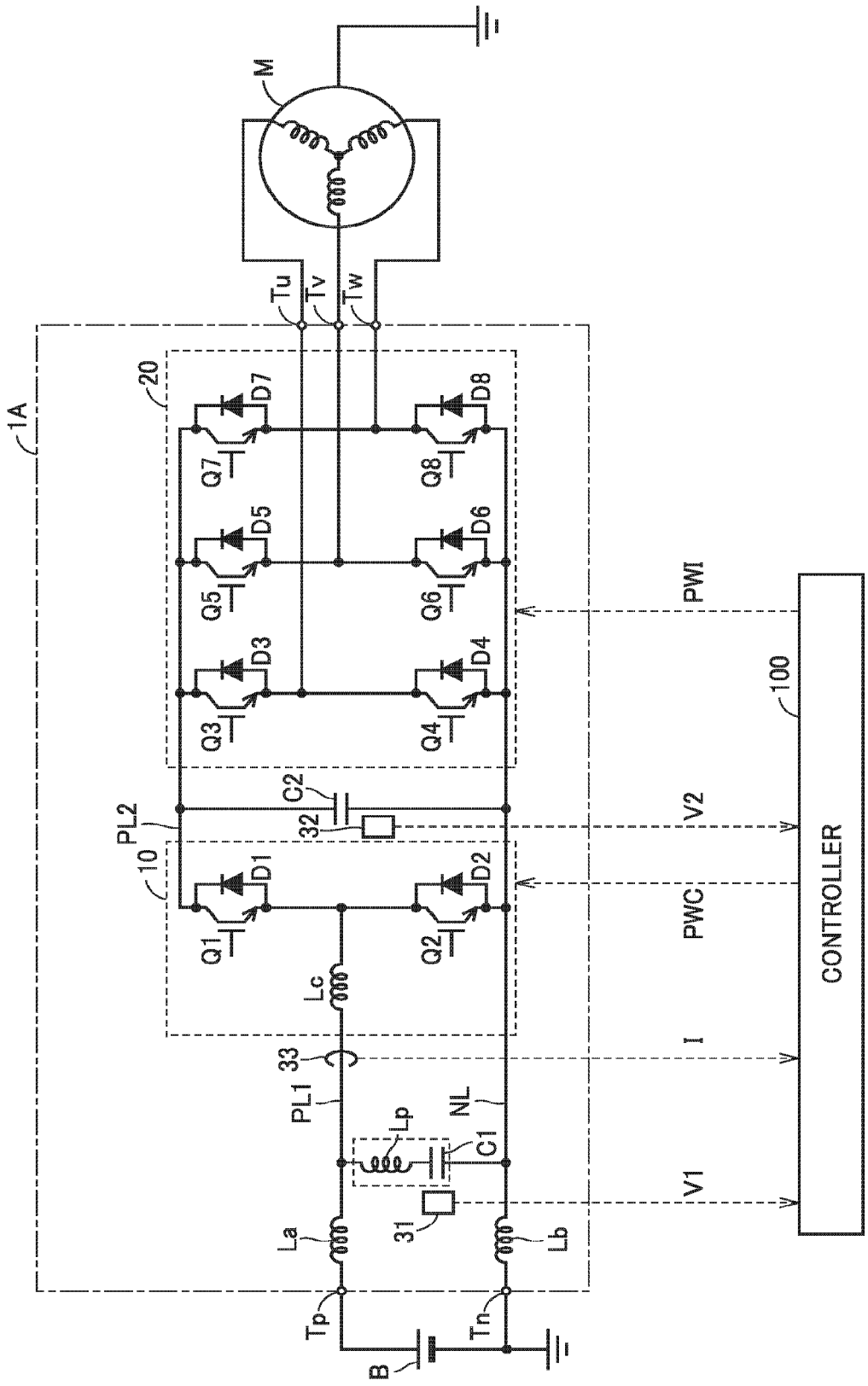
FIG. 7 is a circuit block diagram schematically showing a configuration of a power converter according to a modification of Embodiment 1.

FIG. 7 is a circuit block diagram schematically showing a configuration of a power converter according to a modification of Embodiment 1. Referring to FIG. 7, a power converter 1A differs from power converter 1 according to Embodiment 1 (see FIG. 3) in that it includes an inductor La and an inductor Lb in place of inductor L.

Inductor La (inductance: La) is provided in positive line PL1 between capacitor C1 and positive terminal Tp, whereas inductor Lb (inductance: Lb) is provided in negative line NL between capacitor C1 and negative terminal Tn.

Each of inductors La and Lb is composed of, for example, a discrete component (e.g., coil). At least one of inductors La and Lb may be formed by adjusting the parasitic inductance component of the wire (positive line PL1 or negative line NL). Alternatively, inductors La and Lb each may be composed of a normal mode choke coil in which the positive side and the negative side have an asymmetrical shape. Since the noise propagation path in power converter 1A is similar to the noise propagation path shown in FIG. 4, detailed description by illustration will not be repeated.

Current Ip flowing through positive line PL, and current In and normal mode noise $I_{normal}$ passing through negative line NL are expressed by Equations (7) to (9) below, respectively. Equation (9) reveals that conversion rate T depends on (Lp+La−Lb).

[Math 3]

$$I_p = \frac{Z + i\omega L_b}{2Z + i\omega(L_p + L_a + L_b)} I_{common} \quad (7)$$

$$I_n = \frac{Z + i\omega(L_p + L_a)}{2Z + i\omega(L_p + L_a + L_b)} I_{common} \quad (8)$$

$$I_{normal} = I_n - I_p = \frac{i\omega(L_p + L_a + L_b)}{2Z + i\omega(L_p + L_a + L_b)} I_{common} \quad (9)$$

In comparison between Equation (3) and Equation (9) above, when the coefficient (absolute value) of common mode noise $I_{common}$ on the right side of Equation (9) is smaller than the coefficient (absolute value) of common mode noise $I_{common}$ on the right side of Equation (3), that is, when the relationship $0<Lb-La<2Lp+(\omega^2 Lp^3/Z^2)$ holds after the change and arrangement of these equations, conversion rate T becomes lower by providing inductors La and Lb than in the case where inductors La and Lb are not provided.

When $(\omega^2 Lp^3/Z^2)$ is negligibly smaller than 2Lp and can be expressed as $(\omega^2 Lp^3/Z^2)<<2Lp$, the above condition for reducing conversion rate T can be approximated to $0<Lb-La<2Lp$.

Since conversion rate T is zero when the relationship Lb−La=Lp holds as in Embodiment 1, normal mode noise $I_{normal}$ is smallest.

According to the modification of Embodiment 1, the inductances of inductors La and Lb are set such that the relationship $0<Lb-La<2Lp$ holds also in the configuration in which inductor La is provided in positive line PL1 between capacitor C1 and positive terminal Tp and inductor Lb is provided in negative line NL between capacitor C1 and negative terminal Tn, as described above. In this manner, the inductance (Lb) of path PATH2 and the inductance (La) of path PATH1 are set such that a difference therebetween (Lb−La) is less than twice parasitic inductance component Lp of capacitor C1. Consequently, the difference between the impedance of path PATH1 and the impedance of path PATH2 is smaller than in the case where inductors La and Lb are not provided. This can restrain conversion from common mode noise $I_{common}$ to normal mode noise $I_{normal}$, thus reducing switching noise.

From the viewpoint of reducing the impedance imbalance between path PATH1 and path PATH2, another inductor may be provided in place of inductor L in the configuration of Embodiment 1 shown in FIG. 3. That is to say, though not shown, an inductor having an inductance equal to that of reactor Lc provided in positive line PL1 can be provided in negative line NL between capacitor C1 and switching element Q2. When such a configuration is adopted, however, an inductor larger in size than inductor L in Embodiment 1 is necessary for obtaining an imbalance reducing effect as in the configuration of Embodiment 1. Also, an inductor larger in size than inductors La and Lb (see FIG. 5) in the modification is necessary. That is to say, Embodiment 1 and the modification thereof can reduce switching noise by the installation of an inductor of smaller size.

Embodiment 2

Embodiment 1 and the modification thereof have described the configuration in which an inductor is provided in either or both of path PATH1 and path PATH2. However, a circuit component provided in the path (at least one of path PATH1 and path PATH2) is not limited to an inductor as long as the impedance difference between path PATH1 and path PATH2 is smaller and the impedance imbalance is eliminated (reduced). Embodiment 2 will describe a configuration in which a resistor is provided in path PATH2.

Figure 8:
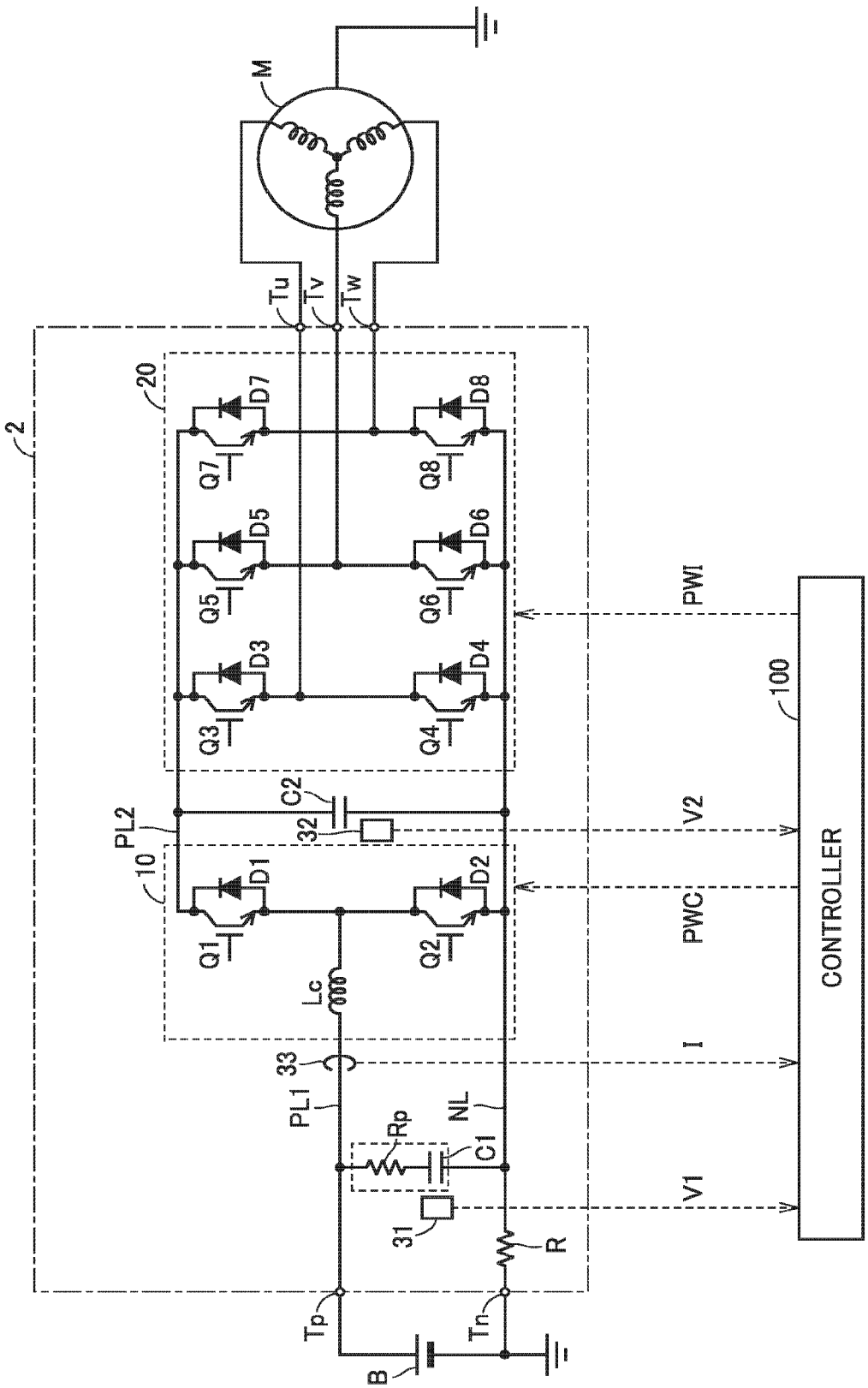
FIG. 8 is a circuit block diagram schematically showing a configuration of a power converter according to Embodiment 2.

FIG. 8 is a circuit block diagram schematically showing a configuration of a power converter according to Embodiment 2. Referring to FIG. 8, capacitor C1 has a parasitic resistance component Rp. Parasitic resistance component Rp is expressed as a resistor connected in series with capacitor C1 (capacitance component) in the circuit block diagram.

Power converter 2 differs from power converter 1 according to Embodiment 1 (see FIG. 3) in that it includes a resistor R in place of inductor L. Resistor R is electrically connected to negative line NL between capacitor C1 and negative terminal Tn. Although resistor R is composed of, for example, a discrete component (e.g., chip resistor), it may be composed of a wiring resistor (parasitic resistor) of negative line NL. Alternatively, resistor R may be achieved by, for example, combining a chip resistor and a wiring resistor of negative line NL.

Other components of power converter 2 are similar to the corresponding components of power converter 1 according to Embodiment 1 (see FIG. 3). Also, the noise propagation path in power converter 2 is similar to the noise propagation path shown in FIG. 4. Detailed description will thus not be repeated.

In Embodiment 2, current Ip flowing through positive line PL, and current In and normal mode noise $I_{normal}$ passing through negative line NL are expressed by Equations (10) to (12) below, respectively. Equation (12) reveals that conversion rate T depends on (Rp−R).

[Math 4]

$$I_p = \frac{Z}{2Z + R_p} I_{common} \quad (10)$$

-continued $$I_n = \frac{Z + R_p}{2Z + R_p} I_{common} \quad (11)$$

$$I_{normal} = I_n - I_p = \frac{R_p}{2Z + R_p} I_{common} \quad (12)$$

As in Embodiment 1, in comparison between Equation (3) and Equation (12), when the relationship $0<Rp-R<2Rp+(Rp^3/Z^2)$ holds after the change and arrangement of these equations, conversion rate T becomes lower by providing resistor R than in the case where resistor R is not provided. When $(Rp^3/Z^2)$ is negligibly smaller than 2Lp (when expressed as $(Rp^3/Z^2)<<2Lp$), the condition for reducing conversion rate T can be approximated to $0<Rp-R<2Rp$. Also, since conversion rate T is zero when R=Rp, normal mode noise $I_{normal}$ is smallest.

In Embodiment 2, resistor R is electrically connected to negative line NL between capacitor C1 and negative terminal Tn, as described above. By setting resistor R such that the difference between the resistance of path PATH2 and the resistance of path PATH1 is less than twice parasitic resistance component Rp of capacitor C1, that is, such that the relationship $0<Rp-R<2Rp$ holds, the difference between the impedance of path PATH1 and the impedance of path PATH2 becomes smaller than in the case where resistor R is not provided. This can restrain conversion from common mode noise $I_{common}$ to normal mode noise $I_{normal}$, thus reducing switching noise.

Although detailed description will not be repeated, Embodiment 2 can adopt the configuration in which a resistor is provided in both of path PATH1 and path PATH2 as in the modification of Embodiment 1.

It is to be understood that the embodiments disclosed herein are presented for the purpose of illustration and non-restrictive in every respect. It is therefore intended that the scope of the present invention is defined by claims, not only by the embodiments described above, and encompasses all modifications and variations equivalent in meaning and scope to the claims.

REFERENCE SIGNS LIST 1, 1A, 2, 9 power converter, 10 converter, 20 inverter, 31, 32 voltage sensor, 33 current sensor, 100 controller, B DC power supply, C1, C2 capacitor, D1-D8 diode, I, In, Ip current, L, La, Lb inductor, Lc reactor, Lp parasitic inductance component, M AC motor, PL, PL2 positive line, NL negative line, Q1-Q8 switching element, R resistor, Rp parasitic resistance component, Tn negative terminal, Tp positive terminal, Tu U-phase terminal, Tv V-phase terminal, Tw W-phase terminal.

The invention claimed is:

1. A power converter comprising:
a positive terminal and a negative terminal that receive power supplied from a DC power supply;
a first power line electrically connected with a first terminal among the positive terminal and the negative terminal;
a second power line electrically connected with a second terminal among the positive terminal and the negative terminal;
a smoothing capacitor having a parasitic inductance component and electrically connected between the first power line and the second power line;
a converter including a reactor provided in the first power line, the converter performing voltage conversion of a DC voltage smoothed by the smoothing capacitor; and
an inverter that performs DC-AC conversion between the converter and an AC load by switching control, wherein
a first path of the first power line has an inductance smaller than an inductance of a second path of the second power line,
the first path connects the first terminal and the smoothing capacitor,
the second path connects the second terminal and the smoothing capacitor, and
a difference between the inductance of the second path and the inductance of the first path is less than twice the parasitic inductance component of the smoothing capacitor.

2. The power converter according to claim 1, further comprising an inductor provided in the second path,
wherein the inductor has an inductance less than twice the parasitic inductance component of the smoothing capacitor.

3. The power converter according to claim 1, wherein
the inductance of the second path is a parasitic inductance component of the second path, and
the parasitic inductance component of the second path is less than twice the parasitic inductance component of the smoothing capacitor.

4. The power converter according to claim 1, further comprising:
a first inductor provided in the first path; and
a second inductor provided in the second path,
wherein a difference between an inductance of the second inductor and an inductance of the first inductor is less than twice the parasitic inductance component of the smoothing capacitor.

5. A power converter comprising:
a positive terminal and a negative terminal that receive power supplied from a DC power supply;
a first power line electrically connected with a first terminal among the positive terminal and the negative terminal;
a second power line electrically connected with a second terminal among the positive terminal and the negative terminal;
a smoothing capacitor having a parasitic resistance component and electrically connected between the first power line and the second power line;
a converter including a reactor electrically connected to the first power line, the converter performing voltage conversion; and
an inverter that performs DC-AC conversion between the converter and an AC load by switching control, wherein
a first path of the first power line has a resistance smaller than a resistance of a second path of the second power line,
the first path connects the first terminal and the smoothing capacitor,
the second path connects the second terminal and the smoothing capacitor, and
a difference between the resistance of the second path and the resistance of the first path is less than twice the parasitic resistance component of the smoothing capacitor.

* * * * *